UNITED STATES PATENT OFFICE.

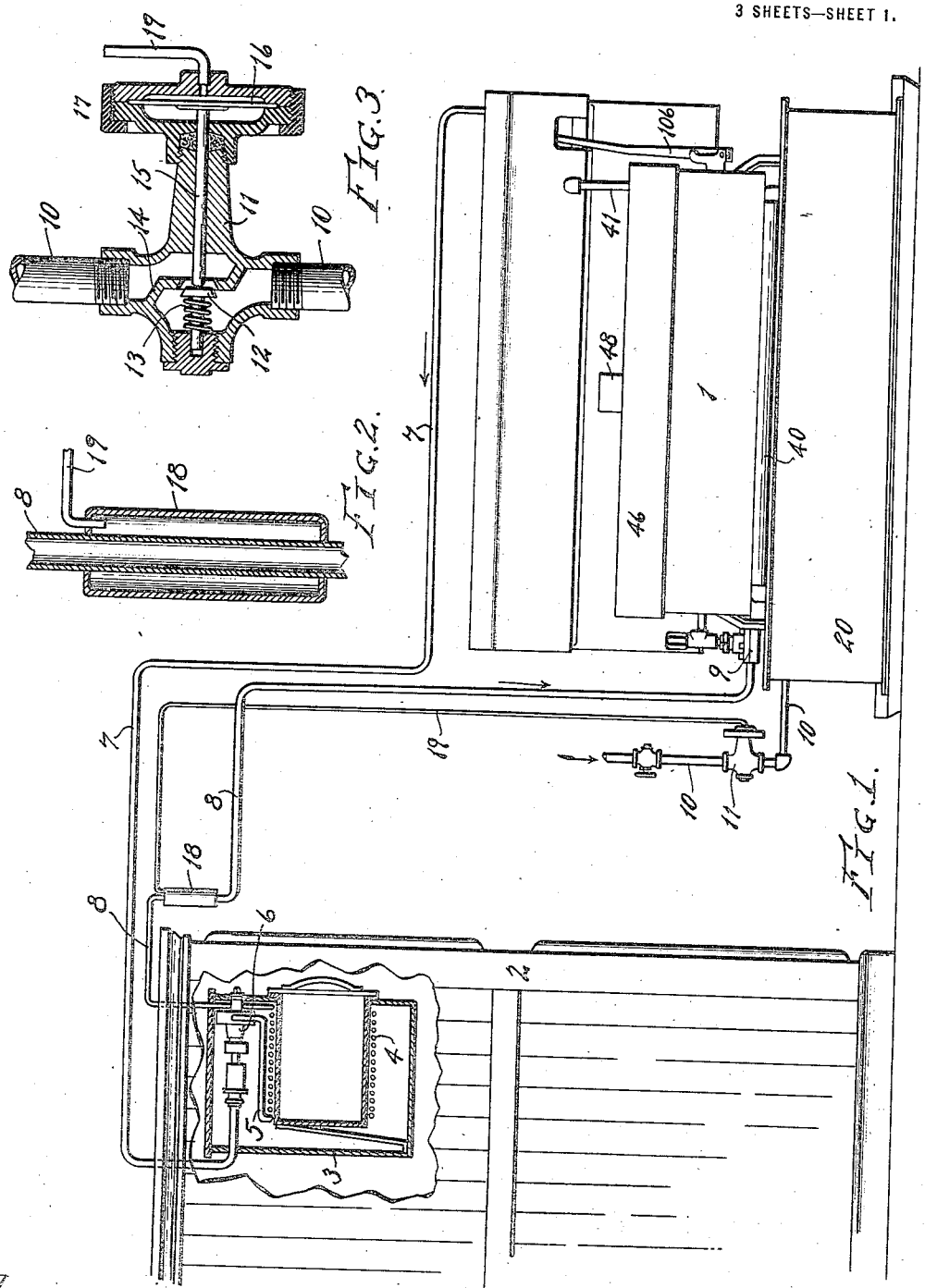

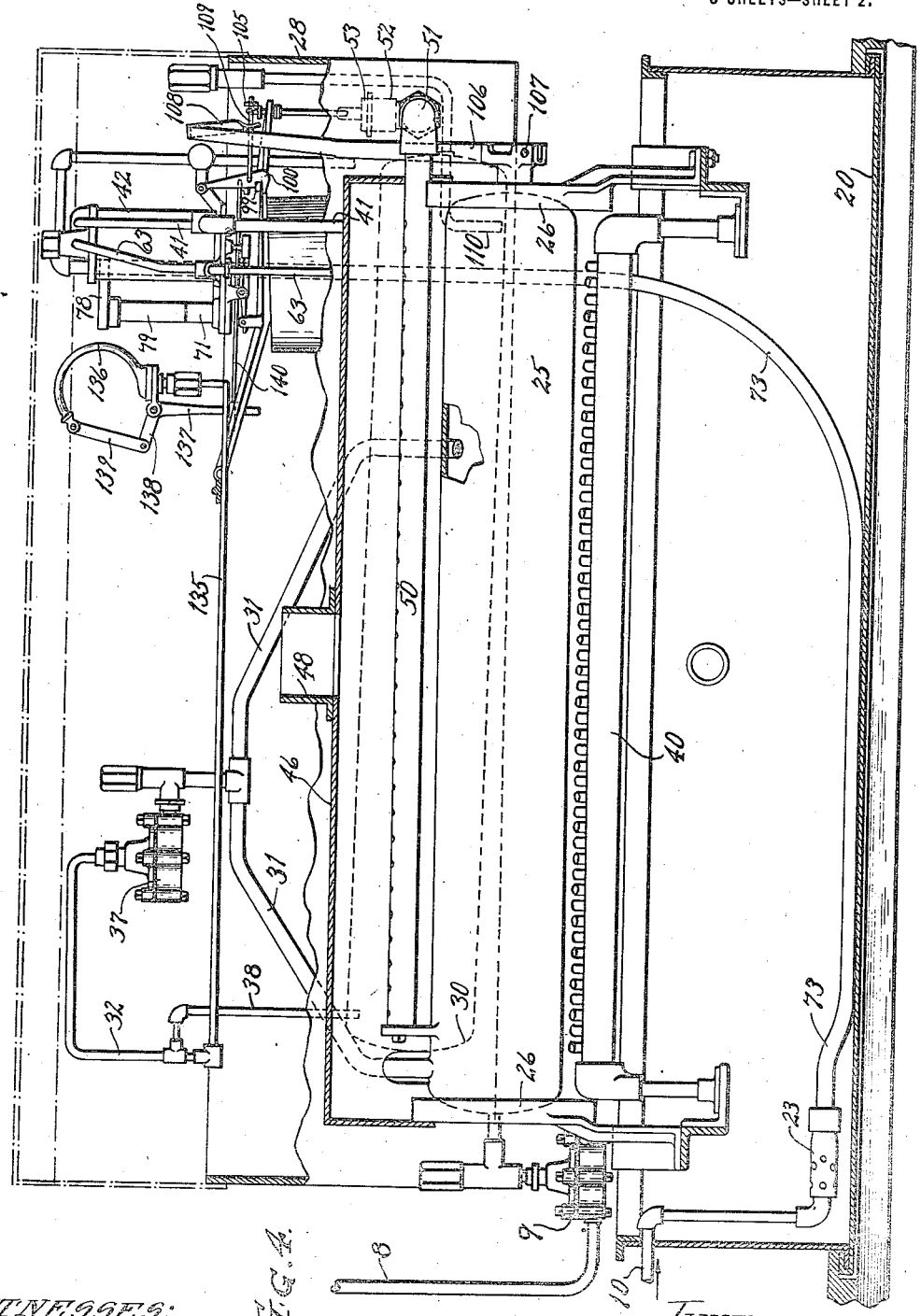

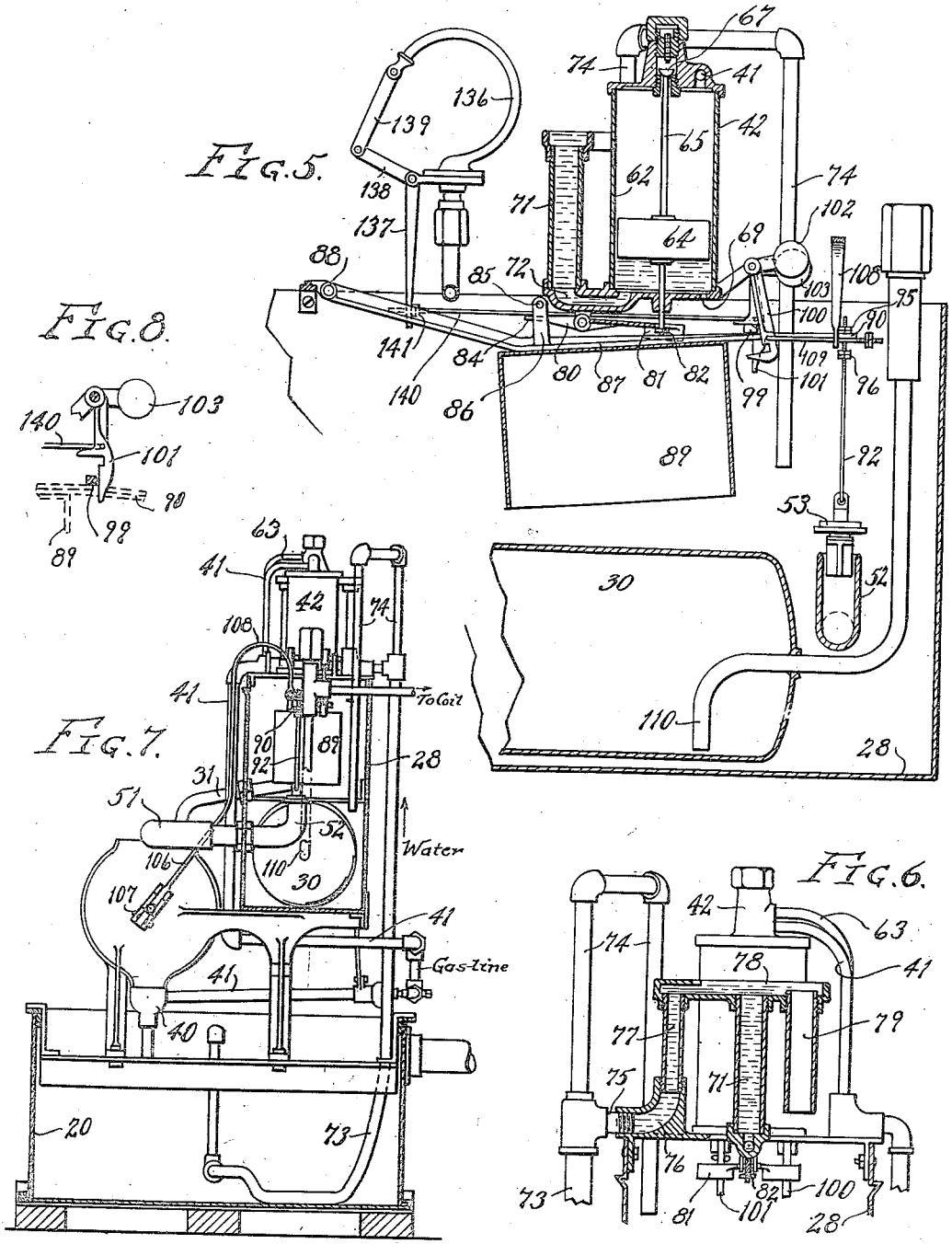

HARRISON H. SOUTHWORTH, OF CHICAGO, ILLINOIS, ASSIGNOR TO THE ICELESS MACHINE COMPANY, OF CLEVELAND, OHIO, A CORPORATION OF OHIO.

REFRIGERATING APPARATUS.

1,174,634.  Specification of Letters Patent.  Patented Mar. 7, 1916.

Original application filed May 8, 1914, Serial No. 837,118. Divided and this application filed May 29, 1915. Serial No. 31,111.

*To all whom it may concern:*

Be it known that I, HARRISON H. SOUTHWORTH, a citizen of the United States, residing at Chicago, in the county of Cook and State of Illinois, have invented a certain new and useful Improvement in Refrigerating Apparatus, of which the following is a full, clear, and exact description, reference being had to the accompanying drawings.

The object of this invention is to provide a simple and efficient equipment for checking the operation of a refrigerating apparatus when the temperature in the refrigerated area has been reduced to the desired minimum, whereby unnecessary, and therefore wasteful, operation of the apparatus is avoided. The thermostatic control, by which I accomplish this, is well adapted for embodiment in a refrigerating apparatus of the intermittent absorption type, in which case a thermostat located adjacent to the refrigerated area, operates, when its temperature is diminished, to reduce the supply of water to the absorber, thereby checking the absorption. The thermostat itself and its direct connections are also adapted for other types of refrigeration apparatus.

The invention shown herein as embodied in a refrigerating apparatus which is shown in my Patent No. 1,162,316, issued November 30, 1915, of which this application is a division. A number of features of the apparatus shown herein therefore are claimed in the parent application referred to. The present application is concerned with the thermostat and the thermostatic control above referred to.

In the drawings Figure 1 is a view in front elevation of an apparatus embodying my invention, this view showing an absorption machine for generating and absorbing the refrigerant; an expansion coil located in a suitable refrigerating box and suitable piping connecting the expansion coil with the machine. Fig. 2 is an enlarged vertical section through the return line and thermostat chamber thereof shown in Fig. 1. Fig. 3 is a vertical section through the thermostatically controlled valve on the water line shown in Fig. 1. Fig. 4 is a sectional front elevation of the refrigerating machine proper, this view being sectioned in a vertical plane through the hood over the generator and through the water tank below the generator, the hood over the condenser being removed but illustrated in position by broken lines. Fig. 5 is an enlarged vertical section of the upper right-hand portion of the machine in a plane parallel with Fig. 1. Fig. 6 is a vertical section through the upright water passages of the gas regulating apparatus, being in diagonal vertical plane at the left and to the rear of the float chamber shown in Fig. 5 and looking toward the right. Fig. 7 is an end view of the machine looking from the right hand end, the tanks being sectioned. Fig. 8 is a detail illustrating a latch which appears somewhat hidden in Fig. 5.

As shown in Fig. 1 the reference numeral 1 indicates a refrigeration machine; 2 indicates any suitable refrigerator, shown as provided with a brine tank 3 within which is an expansion coil 4. The intake side of this coil is connected by a pipe 5 with a back-pressure expansion valve 6 of the usual type, which is connected by a pipe 7 with the liquid anhydrous ammonia discharge pipe of the refrigerating machine. The exhaust side of the coil 4 is connected by a return pipe 8 with a check valve 9 from which the returned ammonia passes back to the machine. The arrows indicate the direction of travel of the ammonia, as will be well understood.

10 indicates a pipe for supplying cooling water to the refrigerating machine, this pipe being controlled by a pressure-operated valve in a casing 11. The valve shown consists of a plug 12 (Fig. 3), provided with a spring 13 which tends to seat it in a port in the septum 14. A rod 15, slidably guided in the stem of the casing, leads from the valve to a flexible diaphragm 16, mounted in a suitable housing 17 carried by the end of such stem. The chamber on the far side of this diaphragm is connected by a pipe 19 with a chamber 18 located about the return line 8 adjacent to the refrigerated area.

Within the casing 18 and the pipe 19 and the chamber on that side of the diaphragm, is contained some fluid of low boiling point and having a high coefficient of expansion and contraction, as for example, sulfur dioxid ($SO_2$). This gas has the advantage of comparatively low pressure within the range of temperature at which the apparatus operates. When the temperature of the thermostatic fluid described is approximately that of the room in which the apparatus is located, the pressure of such fluid against the diaphragm 16 maintains the valve 12 open, and accordingly the thermostatic apparatus is idle. When, however, the refrigerating operation is taking place the frost forms on the return line 8, gradually traveling back from the expansion coil to the refrigerating machine. The return line becoming thus cold, the thermostatic fluid within the casing 18 is cooled, thus reducing its pressure, and this pressure is overbalanced by the spring 13, which immediately closes the valve 12. It will thus be seen that this apparatus enables the checking or entire shutting off of the water whenever, and so long as, the desired minimum temperature has been attained in the refrigerated area. Whenever the temperature rises the valve is automatically opened and the water turned on correspondingly.

I combine the above thermostatic features with an apparatus wherein the diminution or stopping of the flow of water diminishes or stops the supply of refrigerant, whereby unnecessary cooling of the refrigerator is avoided and expense saved. I prefer a refrigerating machine of the intermittent absorption type, and in that case the thermostatic apparatus, which acts only during the absorption period, operates to diminish or stop the flow of water to the absorber. This checks the rate of absorption, and, the absorber ceasing to be sufficiently cooled, its pressure rises, and the back-pressure acting on the expansion valve, stops the flow of refrigerant through the expansion coil.

I have shown the thermostatic controlling device described as combined with an intermittent absorption machine wherein the failure of the water supply during generation shuts off the gas, and I am able with such an apparatus to mount the thermostatically controlled valve on the main water supply pipe, as it has no effect on the flow through that pipe during the generation period and leaves the safety devices to operate in their normal manner. I have accordingly shown a sufficient portion of the apparatus described and claimed in my parent application referred to, to fully explain the course of the water, and its various functions, from the main supply pipe to its final discharge. Such apparatus is shown in Figs. 4 to 8 inclusive and will now be described.

As shown in Figs. 4 and 7, 20 indicates an open tank which constitutes a supporting base for the apparatus and which is adapted to contain cooling water. 25 indicates a drum or still which acts as the generator-absorber. This drum extends parallel with the length of the tank 20 and is supported above the same by suitable brackets 26. 30 indicates a drum of a construction similar to the drum 25 and located preferably in a higher region than that drum and behind it and within a tank 28. This drum 30 is the condenser and receiver for the liquid anhydrous ammonia, and will be hereinafter briefly referred to as the condenser. This condenser is shown as located in a slightly inclined position so that it will drain toward the right hand end, as shown in Figs. 4 and 5. 31, 31 indicate pipes rising from longitudinally spaced points in the top of the still 25 and connected through a suitable check valve 37 to a pipe 32, from which a pipe 38 leads to the condenser. The pipes 31 are covered during the period of generation by water in the tank 28, as will presently appear, so that they act as rectifiers to condense the water vapor carried off with the ammonia gas from the still 25, and the water condensed therein flows back by gravity into the still. The gaseous anhydrous ammonia passes through the check valve, pipes 32 and 38, into the condenser. A pipe 110 leads from the discharge end of the condenser 30 upwardly and then backwardly (Fig. 7) and into the pipe 7, which, as heretofore explained, leads to the back-pressure expansion valve 6, Fig. 1, and thence to the expansion coil 4. The check valves 37 and 9, heretofore referred to, prevent a reverse flow from the condenser to the generator-absorber, or from the generator-absorber to the return line 8, and thus the desired direction of flow (from generator-absorber to condenser to coil and back to generator-absorber) is maintained.

Suitable heating means are provided for the heating of the still during the period of generation. This heating means is shown in Figs. 4 and 7 as a fuel gas burner 40, located beneath the still 25 in the vertical axial plane thereof. This burner is shown as connected by pipes 41 with a fuel gas controlling valve 42. A box-like shield 46 is placed over the drum, spaced from it and having a stack or vent 48 for carrying off the products of combustion.

The fuel gas controlling valve 42 shown herein, is claimed in Patent No. 1,162,314, issued November 30, 1915, to The Iceless Machine Company as assignee of myself and George A. Gase. It is illustrated herein particularly in Figs. 5 and 6, and will now be described.

62 indicates a casing with which the pipe 41 to the gas burner openly connects. Within this casing is a float 64 carrying a stem 65. At the upper end of this stem is a valve plug 67 controlling the passage of gas from a suitable supply pipe 63 to the interior of the casing. 71 indicates a stand pipe adjacent to the casing 62 and connected with the lower portion thereof by a conduit 180

72. This stand pipe, the conduit and the lower portion of the chamber 62, normally contain water, and the height of the column in the stand pipe forms an upward pressure against the float, tending to open the admission valve 67. The higher this valve plug stands, the greater the gas pressure within the chamber pressing downwardly on the water. Accordingly this apparatus makes a gas regulator, the float and its valve remaining in just that position where the gas pressure is balanced by the head of water in the stand pipe.

73 indicates a pipe for supplying cooling water to the apparatus. This pipe comes from the main supply pipe 10 and may be coupled therewith by an injector 23 (Fig. 1) having openings, whereby some of the water in the tank 20 may be used over and over in conjunction with fresh water. From this point the pipe 73 passes along the bottom of the tank and upwardly to a point adjacent to the gas regulator. There it divides, and a part of the pipe leads upwardly as high as the regulator and then downwardly into the tank 28, as shown at 74. Adjacent to the regulator a horizontal branch 75 of the pipe 73 leads into a suitable elbow 76 (Fig. 6), then upwardly through a pipe 77 to a horizontal trough 78. This trough is in communication with the upper end of the stand pipe 71, and has an overflow pipe 79 discharging into the tank 28.

The bottom of the casing 62 is provided with a small opening 69 so that in case the supply of water in the casing is discontinued all the water therein will drain out, which will let the float 64 drop, shutting off the gas. It accordingly results that any failure of the water supply during the generation period immediately extinguishes the gas burner and prevents overheating.

My thermostatic apparatus heretofore described operates to control the flow of water from the pipe 10 only during the absorption period when the burner is already out. It should be noted, however, at this point, that this thermostatic apparatus does not interfere in any way with the safety provisions during the generation period, as just described.

During the absorption period the generator-absorber is cooled by means of water distributed by a pipe 50 perforated on the top and located above the generator-absorber drum and within the shield 46. This pipe 50 is connected by means of a pipe 51 with the water tank 28, the pipe 51 within the tank having an upturned end 52, which may be closed by a plug 53. (Figs. 5 and 7). Automatic devices for raising the valve plug and discharging the water from the tank 28 into the pipe 50 during the absorption period will be presently described.

80 in Fig. 5 indicates a vertically swinging lever fulcrumed to the bottom of the gas regulator and having a weighted arm 81 which is adapted to engage and bear down on a head 82 on the stem 65, which is prolonged downwardly below the casing. This lever also has an arm 84 which is adapted to be engaged by a pin 85 on a lug 86 rising from a lever 87 which is shown as fulcrumed at 88. 89 indicates a float connected with the lever 87. This float is shown as an inverted hollow cup attached to the under face of the lever. The lever extends beyond the float and carries in its end an eye 90, through which depends a rod 92 attached to the valve plug 53, closing the mouth of the pipe 52, heretofore referred to, which controls the outlet of water from the tank 28. The eye 90 works between nuts 95 and 96 on the rod. 99 indicates a transverse bar on the lever 87. This bar is adapted to be engaged by either of a pair of pawls 100 or 101. These pawls are provided with bell crank weighted arms 102 and 103 respectively, adapted to normally hold them in position to engage the transverse bar 99.

The pawl 100 is automatically actuated whenever a predetermined temperature is reached in the generator-absorber when the same is generating, while the pawl 101 is actuated by means depending for its operation upon the reduction of pressure in the condenser 30 resulting when all of the liquid refrigerant therein has been exhausted. As shown, this is accomplished as follows: In the generator-absorber 25 is located a suitable thermostatic tube having a push rod extending out of the right hand end of the drum. This rod operates an arm 106 fulcrumed at 107 and having its upper portion bent over at 108 into position to engage a nut 105 on a rod 109 connected with the pawl 100. The nut is so positioned that when the temperature in the generator-absorber reaches the desired maximum limit the thermostatic rod swings the arm 106 sufficiently so that the end portion 108 engages the nut 105 and draws the catch 100 away from the cross bar 99. The position of the parts just before this takes place is shown in Fig. 4, which represents the generation period. During generation, the pressure of the ammonia gas left from the preceding absorption period in the return line between the expansion valve 6 and the absorber check valve 9 holds the expansion valve closed, thus confining the liquid anhydrous ammonia between that valve and the check valve 37.

The generation period is terminated when the catch 100 releases the cross bar 99, for thereupon the float 89 rises in the water in which it has been submerged into the position shown in Fig. 5. This movement releases the weighted lever 80 which drops down on the head 82 of the gas regulator stem and shuts off the gas. At the same time the end of the lever 87 at the eye 90 engages the nut 95 on the rod 92, raises the valve 53, opening the pipe 52, and discharging water from the upper portion of the tank 28 onto the generator-absorber. At the same time the bar 99 engages the notch of the pawl 101 (Fig. 8), and is thus retained in its uppermost position. Thus the valve 53 remains open, and the water, continuing to discharge into the tank 28 through the pipes 73 and 79, continues to cool the generator-absorber, which thus becomes an absorber. Fig. 5 accordingly shows the condition of the parts throughout the absorption period. During this period water is flowing from the main 10 into the tank 28 and thence through the pipes 52, 51 and 50 over the absorber.

When the generator-absorber has begun to absorb, the check valve 9 opens and the gas pressure in the return line is reduced by the absorption, and this reduction causes the expansion valve to automatically open, whereupon the period of refrigeration begins. It is during this period that the thermostatic control, which is the subject of the present invention, acts.

The fluid (sulfur dioxid gas) in the thermostat casing 18 is exposed to the temperature of the ammonia gas passing through the return pipe 8. As long as the ammonia gas, as it escapes from the outlet end of the expansion coil, has been so vaporized and expanded that it is incapable of materially affecting the temperature of the fluid in the tube 19, that fluid remains expanded by the temperature of the atmosphere and acts on the diaphragm 16 to maintain the valve 12 in open position. This allows the water to flow freely through the pipe 10 and this valve. As the box containing the expansion coil, however, is cooled and the refrigerant ammonia passing through the expansion coil has less and less work to do, the ammonia refrigerant when it reaches the point in the return pipe 8 at which the casing 18 is located, will still be capable of further vaporization, and, therefore, will take up heat from the fluid contained in that casing. This condition will be indicated externally by the fact that the frost line will advance on the pipe 8 to and beyond the casing 18. The cooling of the fluid contained in the casing 18 and in the pipe 19 will cause it to contract with a result that the diaphragm 16, no longer receiving sufficient pressure from said fluid to overcome the normal closing action of the spring 13 will allow the valve to close.

The closing of the valve 12 cuts off the water supply in the pipe 10, and thus the supply of water to the stand pipe 73 will fail and the cooling water which normally flows therefrom into the tank 28, and thence into the water pipe 50 above the still 25, will cease. As the still 25 is no longer cooled by the cooling water and as the refrigerant which still continues to flow to it continues to be absorbed, thus developing heat therein, back pressure in said still and in the return pipe will gradually increase until it reaches a point such that no more refrigerant is capable of passing through the back-pressure expansion valve 6. This greatly decreases the refrigerating operation in the coils and allows the atmosphere to warm the casing 18, which lowers the pressure on the diaphragm valve 12, opening this valve, allowing the cooling water to be supplied to the still, thus lowering the temperature and pressure, and again starting the process of absorption.

The thermostatic means described, checks or stops the absorption whenever the refrigerator is sufficiently cooled. Thus the absorption period is of varying duration according to circumstances. Eventually, however, all the liquid refrigerant in the condenser will have been vaporized. When this takes place the absorption period is automatically terminated and the generation period resumed. In the apparatus illustrated this is accomplished as follow: 135 indicates a pipe connected with the condenser and is shown as leading from the pipe 32. The other end of this pipe is connected with a Bourdon spring 136 operated by the pressure in this line. 137 indicates a bell crank lever fulcrumed in the plane of the Bourdon tube, having an arm 138 connected by a link 139 with the Bourdon tube. The other arm of this lever is preferably substantially vertical and has an eye surrounding a rod 140 and adapted to bear against a nut 141 thereon. The other end of this rod is connected with the pawl 101—Figs. 5 and 8. It will be seen that when the pressure in the condenser is high the Bourdon tube will tend to straighten out, thus swinging the arm 137 idly away from the nut. As the pressure drops, however, the tube contracts and the arm 137 swings toward the right. The pressure remains substantially constant within the condenser so long as there is any liquid anhydrous ammonia therein, for anhydrous ammonia vaporizing maintains the pressure. When, however, the liquid has all vaporized, there is a sudden drop in pressure by reason of lack of supply, thus the Bourdon spring contracts and the arm 137 swings toward the right. This shoves on the rod 140 and pushes the catch 101 out from under the cross bar 99. Thereupon the lever 87, which is weighted by means of the inverted cup 89, drops until the cross bar engages the latch 100. In so dropping the valve 53 becomes seated on the pipe 52, shutting off the water to the absorber and terminating the absorption period. This termination of the absorption period by the exhaustion of liquid anhydrous ammonia is fully claimed in my parent application referred to. When the Bourdon spring releases the suspended lever 87, and the latter drops, as just described, the pin 85 engages and swings the lever 84, which releases the valve stem 65 so that the float 64 opens this valve. Thus the water to the absorber is shut off and the gas is turned on to the burner, and immediately the absorber becomes a generator. The water continues to rise in the tank 28, but it cannot raise the float 89 because the same is latched down by the pawl 100, and accordingly the parts remain in the condition shown in Fig. 4 until the proper temperature is again reached in the generator, when the thermostatic arm 106 swings the pawl 100 to the right to release the latch-down float and terminates the generation period, as heretofore explained.

From the foregoing description it will be seen that the refrigerating period is entirely automatic, causing its own reversals, that is to say, the changes from generation to absorption and from absorption to generation. It will be further seen that the present invention provides for lengthening the absorption period as long as possible with the attainment of sufficiently low temperature in the refrigerator, thus economizing in both gas and water. It will also be seen that while this economizer operates to reduce or stop the water supply during the absorption period it has no effect during the generation period, when the thermostatically controlled valve is wide open, and accordingly it does not interfere in any way with the safety provisions for automatically turning off the gas during the generation period on failure of the water supply.

Having thus described my invention what I claim is:

1. In a refrigerating apparatus of the absorption type, the combination of an absorber, expansion coils, means for supplying liquid refrigerant thereto, means for cooling the absorber, and means for regulating the cooling means dependent for its operation on the temperature condition in the vicinity of the expansion coils.

2. In a refrigerating apparatus of the intermittent absorption type wherein the failure of the water causes a cessation of the absorber operation, the combination of an absorber and expansion coils connected therewith, means for supplying cooling water, a valve controlling the flow of such water and means operating such valve only during the absorption period and controlled by the temperature in the expansion coils.

3. In a refrigerating apparatus of the intermittent absorption type wherein the failure of the water causes a cessation of the absorber operation, the combination of an absorber and expansion coils connected therewith, means for supplying cooling water, a valve controlling the flow of such water, said valve having a diaphragm, a passage leading from said diaphragm to the connections adjacent the coils, and a fluid in said passages adapted to operate said diaphragm when the frost line reaches a predetermined point.

4. In an absorption refrigerating apparatus of the intermittent type, the combination of means for supplying a cooling agent during the absorption period, a thermostatic device indicative of the temperature adjacent to the refrigerated area, and means whereby said thermostatic device when sufficiently cooled may operate to reduce the supply of cooling agent thereby checking the rapidity of absorption.

5. In a refrigerating apparatus, the combination, with a still, an expansion coil and a return line therefrom to the still, of means for supplying cooling agent, and means for supplying heating agent alternately to the still, and a thermostat located on the return line and controlling one of said means.

6. In a refrigerating apparatus, the combination of an expansion coil, an absorber, a return line from the expansion coil to the absorber, means for supplying cooling agent to the absorber, a casing surrounding the return line, a pressure responsive regulator for the cooling agent, and a conduit adapted to hold fluid extending from the regulator to the casing.

7. In a refrigeration apparatus of the absorption type, the combination, with means for conducting a supply of cooling water, a valve for controlling such supply, a diaphragm for operating said valve, a casing extending around a pipe of the refrigerating system, a conduit connecting such casing with the space adjacent to the diaphragm, and an expansible fluid in the conduit and casing.

8. In a refrigerating apparatus of the intermittent type, the combination of a generator-absorber, a receptacle for liquid refrigerant, a conduit leading from the receptacle to the generator-absorber and including an expansion coil, means for automatically controlling the reversals of the generation and absorption period, and a thermostatic device for checking the absorption.

9. In a refrigerating apparatus of the intermittent type, the combination of a generator-absorber, a receptacle for liquid refrigerant, a conduit leading from the receptacle to the generator-absorber and including an expansion coil, means for automatically controlling the reversals of the generation and absorption period, a thermostatic device for stopping the operation of the machine, said device including a pressure operated valve, a fluid thermostat adjacent to the expansion coil, and a conduit between the thermostat and the pressure operated valve.

10. In a refrigerating apparatus, the combination, with means for supplying refrigerating fluid, an expansion coil and a return line, of a thermostatic device comprising a casing surrounding the return line and expansible fluid within the casing, means for controlling the water for cooling the apparatus, and a device for actuating said controlling means under the influence of the thermostatic fluid.

11. In a refrigerating apparatus, the combination, with means for supplying refrigerating fluid, a refrigerating coil and a return line, of a thermostatic device comprising a casing surrounding the return line and expansible fluid within the casing, means for supplying water for cooling the apparatus, a valve for controlling such water, a pressure device for holding the valve open under the influence of the thermostatic fluid, and a spring tending to close the valve.

12. In a refrigerating apparatus of the intermittent absorption type, the combination of a generator absorber, heating means therefor, cooling means for the generator absorber, means for shutting off the heating means automatically upon the failure of the cooling means during the period of generation, and means for shutting off the cooling means during the period of absorption whenever the temperature in the vicinity of the expansion coil has reached a predetermined minimum.

13. In a refrigerating apparatus of the absorption type, the combination, with an expansion coil, of a generator absorber and outgoing and return pipes between the generator absorber and the expansion coil, a conduit for supplying cooling water to the absorber, and a thermostat on the return line adapted to control the passage of cooling water.

14. In a refrigerating apparatus of the absorption type, the combination of an absorber, an expansion coil, means for supplying a liquid refrigerant thereto, means for cooling the absorber, and means for regulating the cooling means dependent for its operation on the frost line on the return pipe.

15. In a refrigerating apparatus, the combination with an absorber, expansion coil and return line from the coil to the absorber, of a conduit for cooling water for the absorber, a pressure controlled valve in said conduit, a casing surrounding the return line, a pipe leading from the casing to the pressure responsive device of said pressure controlled valve, and a thermostatic fluid in said casing and pipe.

In testimony whereof, I hereunto affix my signature.

HARRISON H. SOUTHWORTH.